United States Patent [19]
Thorman et al.

[11] Patent Number: 5,732,538
[45] Date of Patent: Mar. 31, 1998

[54] SPRINGLESS ROLLER SCRAPER MECHANISM

[75] Inventors: Christopher Scott Thorman; Phillip Orland Swenson, both of Beaver Dam; Ronald Lee Reichen, Horicon, all of Wis.

[73] Assignee: Deere & Company, Moline, Ill.

[21] Appl. No.: 498,490

[22] Filed: Jul. 5, 1995

[51] Int. Cl.$^6$ ................................................ A01D 55/28
[52] U.S. Cl. ................................................ 56/249; 56/7
[58] Field of Search .................... 15/295, 256.51; 56/13.5, 249, 249.5, 250, 7; 111/52, 167; 172/558, 56 D, 566, 610; 404/129, 124, 131

[56] References Cited

U.S. PATENT DOCUMENTS

| | | | |
|---|---|---|---|
| 1,916,330 | 7/1933 | Norstrom | 172/566 |
| 1,996,676 | 4/1935 | Hargrave | 172/558 |
| 2,079,979 | 5/1937 | Worthington | 56/7 X |
| 2,111,016 | 3/1938 | Worthington | 56/7 |
| 2,815,524 | 12/1957 | Mitchell | 56/249 X |
| 4,021,996 | 5/1977 | Bartlett et al. | 56/249 X |
| 4,872,295 | 10/1989 | Beckett et al. | 56/249 X |
| 5,511,365 | 4/1996 | Rice | 56/249 X |

OTHER PUBLICATIONS

Jacobsen, brochure entitled "Turf Groomer™ Greens Conditioner", 3 pages, dated 1989, published in the U.S.A.
The Toro Co., brochure entitled "The New Toro Grooming Reel for the Riding Greensmaster, The Most Universal Tool Available for Grooming and Conditioning Your Greens", pages, dated Feb. 1989, published in the U.S.A.

*Primary Examiner*—Terry Lee Melius
*Assistant Examiner*—Robert Pezzuto

[57] ABSTRACT

A mechanism for scraping debris from the roller of a reel mower cutting units, and including a rod member having end portions pivotally supported by brackets. A plate member is fixed with the rod member and includes a non-linear edge portion which generally mates with the surface of the roller. The weight of the rod and plate member urges the rod to pivot the plate member toward the roller for wiping debris from said roller. The rod members abut portions of the brackets for limiting pivoted motion of the rod and plate members away from the surface of the roller. The plate member can also be fixed to the rod member so that a straight edge portion of the plate member will wipe debris from a roller having a smooth surface.

8 Claims, 2 Drawing Sheets

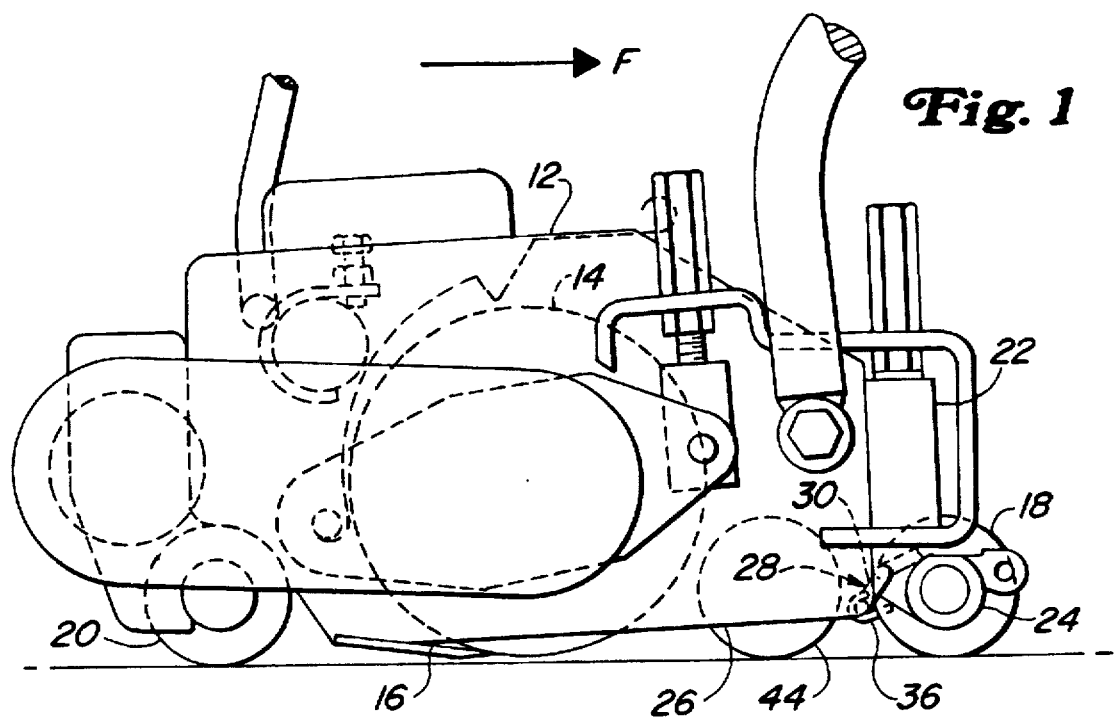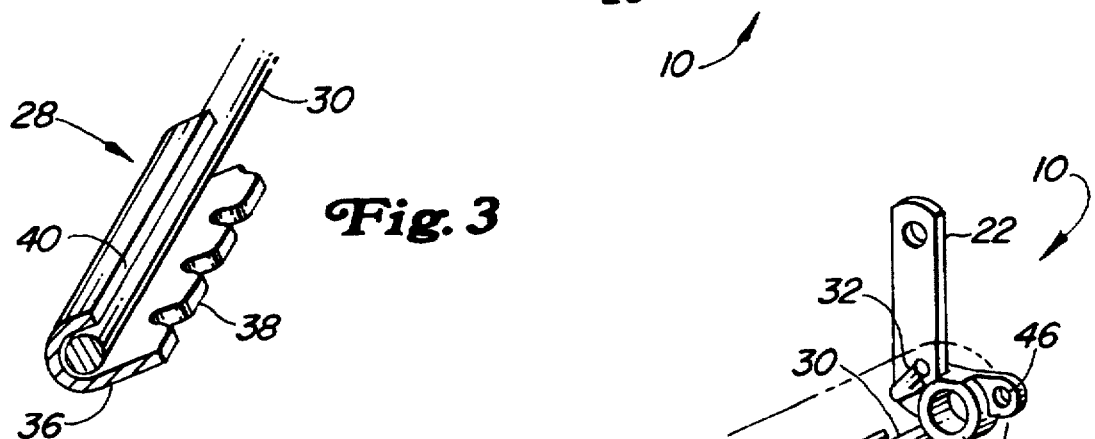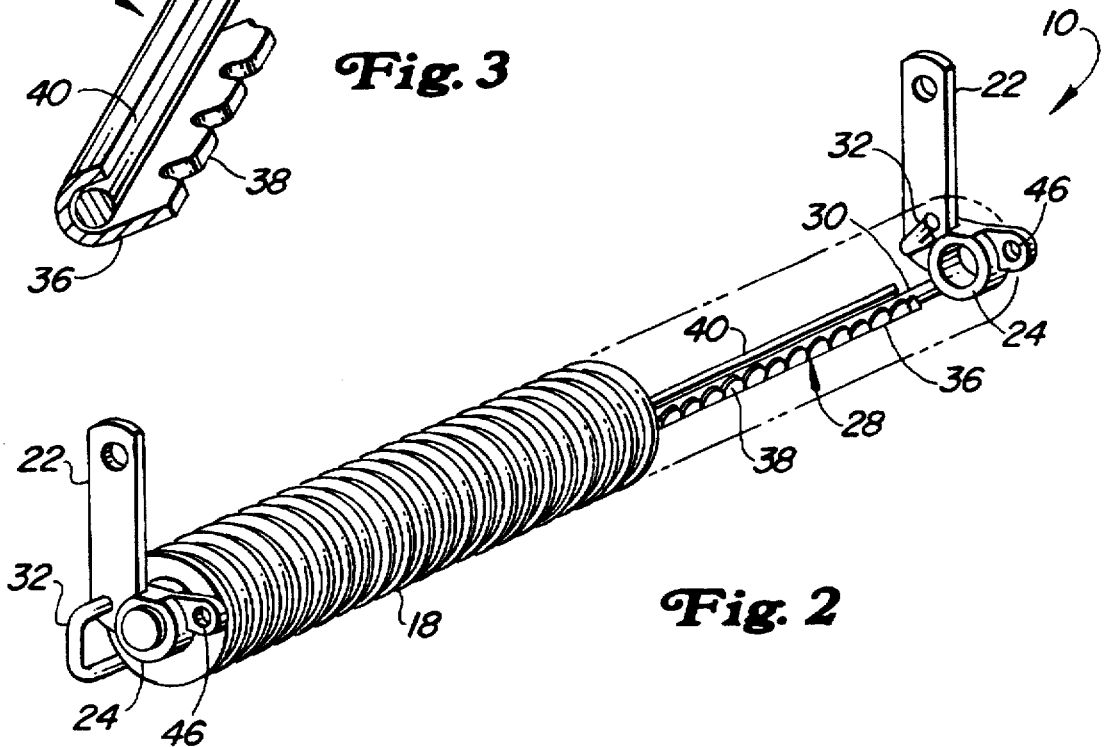

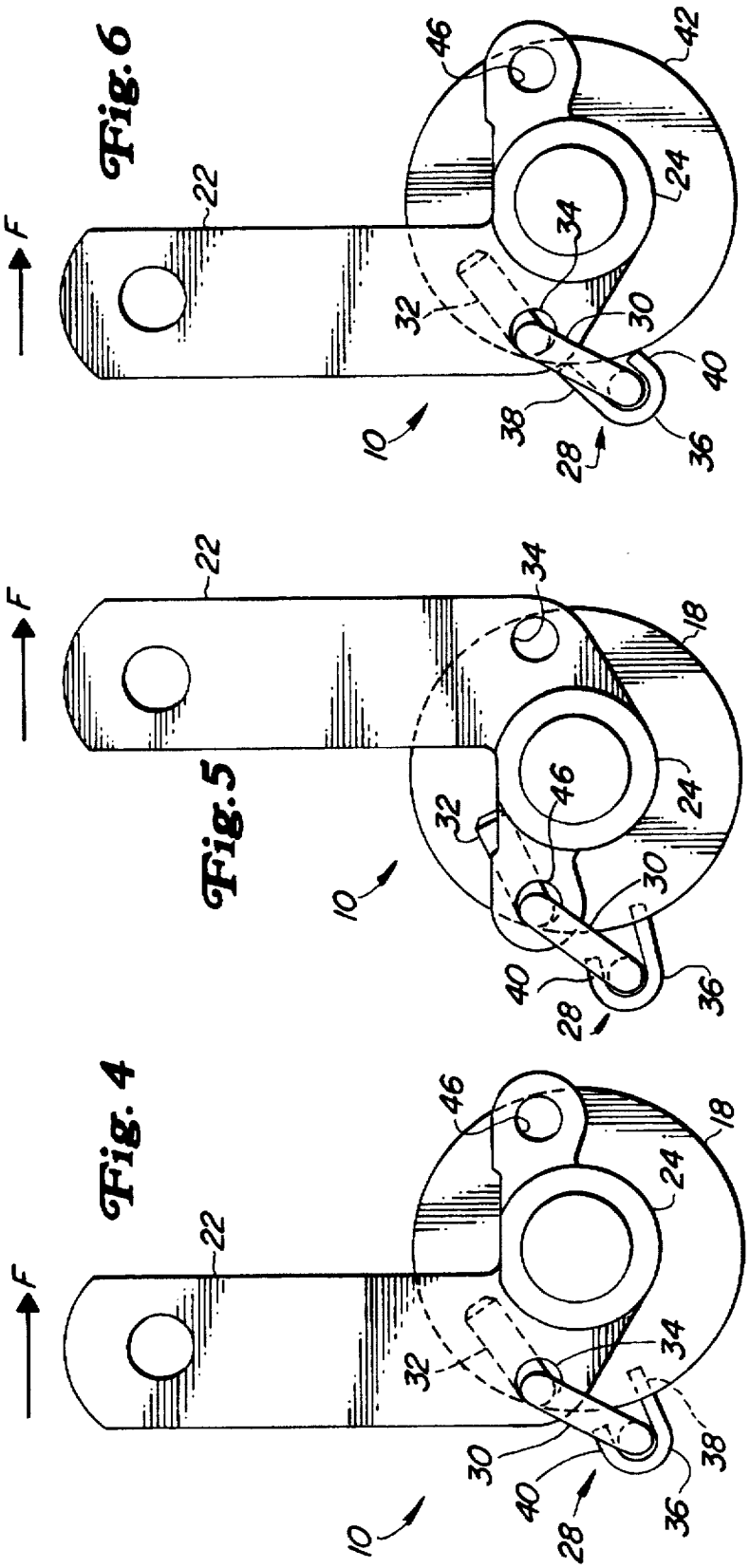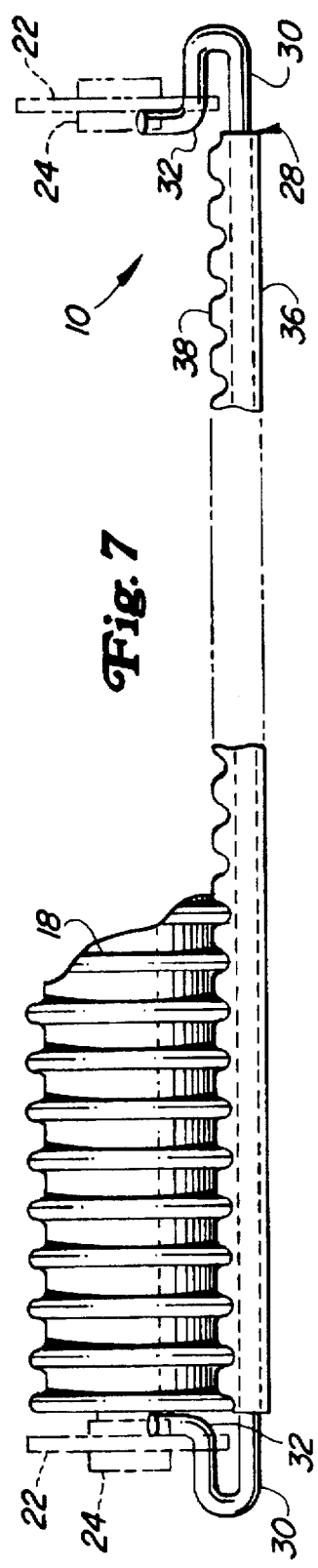

SPRINGLESS ROLLER SCRAPER MECHANISM

FIELD OF THE INVENTION

The present invention relates to mechanisms which scrape debris from ground engaging rollers mounted to reel mower cutting units.

BACKGROUND OF THE INVENTION

Conventional reel mower cutting units provide accurate grass mowing of turf areas such as golf courses. Reel mowers are typically provided with a pair of ground engaging rollers mounted to the cutting unit and which roll across the surface of the turf for supporting the cutting units during operation. A generally cylindrical cutting reel and a bed knife are positioned between the pair of front and rear rollers and interact to cut grass with a shearing action.

One type of reel mower cutting unit provides rollers which have a smooth ground engaging surface. Debris such as dirt, sand and grass clippings tends to accumulate on the smooth outer surface of the roller. This accumulation of debris can cause the effective diameter of the roller to increase, which causes the cutting reel and bed knife to travel across the ground at a greater height. The cutting height and cut quality are thereby undesirably affected by the accumulation of debris on the roller. It is known to provide these smooth rollers with roller scrapers which generally scrape or wipe debris from the rollers. Conventional roller scrapers are coupled with the cutting unit frame and extend laterally the entire width of the roller. A spring mechanism is typically provided for urging the scraper toward and against the roller. Roller scrapers generally include attaching hardware such as brackets and bolts which couple the scraper to the cutting unit frame. Some reel mower cutting units position the rollers relatively close together near the cutting reel to provide a short effective wheelbase which allows the reel to closely follow the ground contour even when undulating terrain is encountered. A relatively precise cut is thereby achieved by the short wheelbase. The space between the roller and cutting reel is relatively limited, and some cutting units do not provide enough space for a roller scraper, its attaching hardware and springs.

It is known to provide reel mower cutting units with a second type of front roller having vertical grooves and vertically protruding portions which contact the ground. As the protruding portions contact the ground they act to gently fluff the grass for cutting by the reel and bedknife. Some grooved rollers are manufactured from a single solid part into which vertical grooves are machined. Another type of grooved roller includes a plurality of washers and spacers which are stacked on a tube. The washers have a larger diameter than the spacers and roll in contact with the ground during operation. Because of the irregular shape of grooved rollers, many cutting units having grooved rollers are not provided with a scraper.

It would therefore be desirable to provide a roller scraper mechanism which generally clears debris from a roller of a reel mower cutting unit, and which is constructed in a compact manner with few parts so that it can be assembled and operate within a relatively small space between the roller and the cutting reel. It would be desirable for the roller scraper mechanism to be manufactured from relatively few parts such that the mechanism is relatively inexpensive to manufacture. It would also be desirable for such a mechanism to be easily mounted to the cutting unit such that assembly costs are kept relatively low. It would be desirable for such a mechanism to be adapted to scrape or wipe debris from a grooved roller.

SUMMARY OF THE INVENTION

The preferred embodiment of the present invention provides a mechanism for scraping or wiping debris from the surface of a reel mower cutting unit's grooved ground engaging roller. Brackets support a front roller and serve to mounted the front roller to the cutting unit frame. The brackets are shiftable vertically with respect to the cutting unit for adjusting the height at which the grass is cut. A scraper member is provided by the present invention which includes a rod member pivotally supported by openings in the brackets, and a roller engaging member fixed with the rod member. The present invention is configured such that the weight of the rod member and roller engaging member serve to pivot the scraper toward and against the surface of the roller. Gravity serves as the sole means for biasing the scraper against the roller, which eliminates the need for more complex and costly spring mechanisms. The rod member is received within openings in the brackets without requiring more complex attaching hardware, which allows the assembly of the scraper mechanism to be relatively simple and quick. The scraper assembly has relatively few parts, which helps reduce the cost of the mechanism and allows the scraper to be compact for fitting into spaces having limited volumes.

Since the rod member is supported in openings in the brackets, the rod member will shift vertically with the bracket during cutting height adjustments. The scraper therefore remains aligned with the roller after cutting height adjustments without further effort by the operator.

The roller engaging member has a grooved edge portion which generally mates with or matches the profile of the grooved roller, which enables the scraper to better clear debris from a relatively large portion of the surface of the roller. The roller engaging member also includes a straight edge portion which is adapted for clearing debris from the surface of a smooth roller. The roller engaging member is therefore a single part adapted for being fixed to the rod in two different modes so that the scraper can be mounted to a cutting unit having either smooth or grooved rollers.

The brackets according to the present invention are adapted for being mounted to the cutting unit in either of two configurations. In the first, the bracket supports the roller in a position spaced a sufficient distance from the reel such that an additional turf engaging tool can be positioned between the front roller and the reel. In the second configuration the bracket supports the front roller in close proximity to the front of the reel to thereby establish a shorter effective wheelbase for the cutting unit to allow the cutting unit to better follow undulating ground contours. The scraper is adapted for mounting to the bracket for cleaning the roller in either of these two modes.

BRIEF DESCRIPTION OF THE DRAWINGS

FIG. 1 is a side view of a reel mower cutting unit having the roller scraper according to the present invention.

FIG. 2 is a perspective view of the scraper member, brackets and roller according to the present invention.

FIG. 3 is a sectional view of the scraper member's roller engaging member and rod member according to the present invention.

FIG. 4 is a partial side view of the scraper member, bracket and roller of the present invention with the bracket in the position shown in FIG. 1.

FIG. 5 is a partial side view of the scraper member of the present invention with the bracket mounted to the cutting unit frame in its second configuration to support the roller in a position closer to the cutting reel than the bracket in the position shown in FIG. 4.

FIG. 6 is a partial side view of the scraper member of the present invention with the roller engaging member having its straight edge portion being oriented to engage a smooth surfaced roller.

FIG. 7 is a partial plan view of the scraper and grooved roller and brackets according to the present invention.

DETAILED DESCRIPTION OF THE PREFERRED EMBODIMENT

Referring now to FIGS. 1–7, there is shown a roller scraper mechanism 10 according to the preferred embodiment of the present invention. A reel mower cutting unit 12 is provided having a generally cylindrical cutting reel 14 and a laterally extending bedknife 16 which interact to cut vegetation and grass with a scissoring action. The cutting unit 12 is supported on the ground by ground engaging front and rear rollers 18 and 20. The front roller 18 is a machined grooved roller rotatably journaled in a pair of brackets 22. The brackets 22 include hubs 24 which rotatably receive the front roller 18. The brackets 22 are coupled with the cutting unit frame 26 for fixing the front roller 18 to the frame 26 and are vertically adjustable for changing the height at which the cutting unit 12 rolls above the ground surface. The height at which the reel 14 and bedknife 16 cut vegetation is thereby adjustable for altering the cutting height.

A roller scraper member 28 according to the preferred embodiment provides a rod-like member 30 which extends generally the entire lateral width of the roller 18, and includes laterally outer end portions 32 which are pivotally received within openings 34 defined in the brackets 22.

The roller scraper member 28 includes a roller engaging member or elongate plate member 36 welded or otherwise fixed to the rod-like member 30. The plate member 36 includes a grooved edge portion 38 which generally mates with the grooved surface of the roller 18 for generally wiping debris from the surface of the roller 18 and from within the grooves found therein. The plate member 36 also includes a straight edge portion 40. During assembly of the present invention, the end portions 32 of the rod-like member 30 are positioned within the openings 34 defined in the brackets 22, and the end portions of the roller 18 are positioned within hubs 24 of the brackets 22. The brackets 22 are then coupled with the cutting unit frame 26, and the roller 18 and roller scraper member 28 are thereby mounted to the cutting unit 12. To adjust the cutting height, the brackets 22 are adjusted vertically to thereby alter the height at which the reel 14 and bedknife 16 travel above the ground. The scraper member 28 is coupled with the brackets 22 and is therefore automatically vertically adjusted with the roller 18 as the brackets 22 are shifted up or down.

During operation of a cutting unit 12 having the roller scraper member 28 according to the preferred embodiment of the present invention, the plate member 36 is positioned proximate to and in abutment with the roller 18 for scraping or wiping debris from the roller 18. The end portions 32 of the rod-like member 30 are free to pivot within the openings 34 defined in the brackets 22. The rod-like member 30 and plate member 36 according to the preferred embodiment has a center of gravity which tends to pivot the plate member 36 and rod-like member 30 toward and against the roller 18 under the force of the weight of the rod 30 and plate member 36. Referring to FIGS. 1, 4 and 6, it can be seen that the center of gravity of the rod 30 and plate member 36 is located to the rear of the opening 34 which pivotally receives the rod. The weight of the rod 30 and plate member 36 therefore causes the rod 30 to pivot downwardly and forwardly about the rod's pivot axis. The weight of the scraper member 28 therefore biases the plate member 36 to a position proximate to or in abutment with the roller 18 such that debris is scraped or wiped from the roller 18. Since the weight of the scraper member 28 biases or urges the roller engaging member 36 against the roller 18, the need for a spring or other biasing means is eliminated. Pivotal movement of the rod-like member 30 and roller engaging member 36 away from the roller 18 is generally limited by the abutment of the end portion 32 of the rod-like member 30 against the hub 24 of the bracket 22, as shown in FIG. 7. Excessive pivoting of the rod-like member 30 and plate member 36 is therefore eliminated such that the scraper member 28 is kept in close proximity to the roller 18.

The present invention provides a rod-like member 30 which is pivotally received within openings 34 defined in the brackets 22. The bends in the end portions 32 of the rod member 30 serve to capture the rod 30 within the openings 34 after assembly, and generally prevent the scraper member 28 from becoming uncoupled from the brackets 22. The mounting mechanism which couples the roller scraper member 28 with the cutting unit 12 is therefore relatively simple and includes relatively few parts. The low part count and simple construction of the mounting structure allows the roller scraper mechanism 10 to be assembled and mounted to the cutting unit 12 relatively quickly and easily, thereby generally reducing assembly costs. The present invention eliminates the need for complicated attachment hardware and bracketry, and therefore the mechanism can be assembled and operate within a relatively small space between the roller 18 and cutting reel 14. Even if the cutting unit is adapted for positioning the roller 18 relatively close to the cutting reel 14, the roller scraper 10 according to the preferred embodiment can be assembled and operate within the confined space provided.

The roller 10 as best seen in FIGS. 2 and 7, is a grooved roller which is designed to generally fluff or agitate the vegetation in front of the cutting reel 14. The scraper member 28 according to the preferred embodiment provides a plate member 36 having a grooved edge 38 which generally mates with the grooved surface 38 of the roller 18. The mating surface of the plate member 36 is able to scrape or wipe debris from the entire surface of the roller 18 including the grooves formed in the roller 18. The mechanism of the present invention can also be adapted for scraping a roller having a smooth surface. During manufacture of the scraper member 28 the plate member 36 according to the preferred embodiment can be welded or otherwise fixed to the rod-like member 30 so that the straight edge portion 40 is positioned for contacting the smooth roller 42, as shown in FIG. 6. As described above, the scraper member 28 shown in FIG. 6 is biased by its own weight against the surface of the smooth roller 42, and the end portions 32 of the rod 30 contact the hub 24 of the bracket 22 to limit the pivotal movement of the rod 30 and plate member 36 away from the smooth roller 42.

The cutting unit 12 shown in FIG. 1 is adapted to receive an additional mechanism 44 which is positionable between the front roller 18 and cutting reel 14 for further agitating or slicing vertically into the ground and through the vegetation directly in front of the cutting reel 14. FIGS. 1, 2, 4 and 6 show the brackets 22 positioned in a first configuration, wherein the front brackets 22 support the front roller 18 in a forward position to thereby create space between the front roller 18 and reel 14 which the additional mechanism 44 occupies. When such an additional mechanism 44 is not going to be used, the brackets 22, scraper member 28 and roller 18 can be disassembled and remounted to the cutting unit 12 with the bracket 22 in a second configuration as shown in FIG. 5. The bracket 22 of FIG. 5 has been rotated 180 degrees from the position shown in FIGS. 1 and 4. In the position shown in FIG. 5, the bracket 22 supports the front roller 18 in a rearward location closer to the reel 14. This establishes a shorter effective wheelbase between the rollers 18 and 20, which allows the reel 14 and bedknife 16 positioned between the rollers 18 and 20 to more accurately follow undulations in the surface of the turf. The end portions 32 of the rod 30 as shown in FIG. 5 are positioned within second openings 46 formed in the bracket 22.

We claim:

1. A scraping mechanism adapted for scraping debris from a ground engaging roller of a reel mower cutting unit, said scraping mechanism comprising:

a scraper member pivotally coupled with the cutting unit and adapted for scraping debris from said roller, and the weight of the scraper member is a sole means for biasing the scraper member toward the roller for scraping debris from said roller, and a portion of the scraper member abuts the cutting unit for limiting the pivotal movement of the scraper member away from the roller for maintaining the scraper member in close proximity to the roller, and outer end portions of the scraper member are pivotally received within openings defined by the cutting unit and define an axis about which the scraper member pivots toward the roller, and said outer end potions define bend portions which confine the scraper member within the openings and which operatively abut the cutting unit for limiting the pivotal motion of the scraper member away from the roller.

2. The invention of claim 1, wherein the scraper member further comprises:

an elongate member which is positioned proximate the roller for scraping debris from said roller.

a rod member to which the elongate member is coupled and outer end portions of the rod member are pivotally received within openings defined by the cutting unit for defining an axis about which the scraper member pivots toward the roller.

3. The invention of claim 2, wherein the cutting unit further comprises:

brackets which define the openings which pivotally receive the outer end portions of the rod member.

4. The invention of claim 3, wherein said bracket couple said roller with the reel mower cutting unit and are selectively vertically shiftable with respect to the cutting unit for adjusting a cutting height of the reel mower cutting unit, and said scraper member shifts vertically with the brackets.

5. The invention of claim 4, wherein the bend portions are defined by the rod member and is abutable with at least one of the brackets for limiting the pivotal movement of the elongate member away from the roller.

6. The invention of claim 1, wherein the roller includes a generally non-smooth surface, and the scraper member includes an edge portion which generally mates with the surface of the roller for scraping debris from a large portion of said surface.

7. A scraper mechanism adapted for scraping debris from a ground engaging roller of a reel mower cutting unit, said scraper mechanism comprising:

a scraper member having weight, a first portion of the scraper member is pivotally received within an opening defined by the cutting unit and defines an axis about which the scraper member pivots, wherein the weight of the scraper member is a sole means for biasing the scraper member toward the roller for scraping debris from the roller, and a second portion of the scraper member is abutable with the cutting unit for limiting pivotal movement of the scraper member away from the roller during operation for maintaining the scraper member in close proximity to the roller, said scraper member further comprises:

a plate member positioned proximate the roller for scraping debris from said roller, and a rod member coupled with the plate member, the outer end portions of the rod member being pivotally received within openings defined by the cutting unit for defining an axis about which the rod member and plate member pivot, said cutting unit further comprises:

brackets which define the openings that receive the outer end portions of the rod member, wherein outer end portions of said rod member define bend portions which confine the scraper member within the openings, wherein said brackets are mountable in first and second configurations, in the first configuration the brackets are rotated 180 degrees from that of the second configuration and support the roller in a forward position for establishing a relatively large clearance between the roller and the cutting reel, and in the second configuration the bracket supports the roller closer to the cutting reel than in the first configuration, wherein the openings defined in the brackets respectively support the rod member when the brackets are in either the first or second configuration.

8. A scraper mechanism adapted for scraping debris from a ground engaging roller of a reel mower curing unit, said scraper mechanism comprising:

brackets coupled with the curing unit and defining openings, said brackets support said roller during operation, a rod member having laterally outer end portions pivotally received within the openings defined in the brackets, said end portions define an axis about which the rod member is pivotable toward and away from the roller, a roller engaging member fixed with the rod member and positionable in close proximity to the roller for scraping debris from said roller, wherein gravity is a sole means for biasing the rod member and roller engaging member to pivot toward the roller.

said brackets are shiftable vertically with respect to the curing unit for adjusting a cutting height of the cutting unit, and said rod member shifts vertically with the bracket during said cutting height adjustments, and the laterally outer end portions of said rod include bends that define portions of the rod member that are abutable with the brackets for limiting pivotal movement of the rod member and roller engaging member away from the roller for maintaining the roller engaging member in close proximity to the roller, said bend portions also define portions of the rod member that abut the bracket for capturing the rod within the openings in the brackets and blocking the rod from shifting laterally out of said openings.

* * * * *

UNITED STATES PATENT AND TRADEMARK OFFICE
CERTIFICATE OF CORRECTION

PATENT NO. : 5,732,538
DATED : Mar. 31, 1998
INVENTOR(S) : Christopher Scott Thorman et al.

It is certified that error appears in the above-indentified patent and that said Letters Patent is hereby corrected as shown below:

Claim 1, column 5, line 30, delete "potions" and insert -- portions --.

Claim 4, column 5, line 47, delete "bracket" and insert -- brackets --.

Claim 8, column 6, line 37, delete "curing" and insert -- cutting --.

Claim 8, column 6, line 39, delete "curing" and insert -- cutting --.

Claim 8, column 6, line 53, delete "curing" and insert -- cutting --.

Signed and Sealed this

First Day of December, 1998

*Attest:*

*Attesting Officer*

BRUCE LEHMAN

*Commissioner of Patents and Trademarks*